United States Patent [19]
Onishi et al.

[11] Patent Number: 6,086,212
[45] Date of Patent: Jul. 11, 2000

[54] PANEL LIGHT SOURCE DEVICE AND DISPLAY COMPRISING IT

[75] Inventors: Ikuo Onishi; Katsuya Fujisawa; Rikuji Watanabe, all of Tsukuba; Toshiyuki Yoshikawa, Tokyo, all of Japan

[73] Assignee: Kuraray Co., Ltd., Kurashiki, Japan

[21] Appl. No.: 09/146,171

[22] Filed: Sep. 3, 1998

[30] Foreign Application Priority Data

Sep. 8, 1997 [JP] Japan ................................. 9-243189

[51] Int. Cl.[7] ....................................................... F21V 5/00
[52] U.S. Cl. ............................ 362/31; 362/19; 362/263; 362/331; 349/65
[58] Field of Search .............................. 349/65; 362/19, 362/268, 331

[56] References Cited

U.S. PATENT DOCUMENTS 5,775,799  7/1998  Forkner ................................ 362/268
5,776,636  7/1998  Kunisawa et al. .
5,838,403  11/1998  Jannson et al. ......................... 349/65

*Primary Examiner*—Sandra O'Shea
*Assistant Examiner*—Anabel Ton
*Attorney, Agent, or Firm*—Oblon, Spivak, McClelland, Maier & Neustadt, P.C.

[57] ABSTRACT

Provided is a panel light source device through which the light availability is increased. The luminance of light to be outputted by the device in the oblique direction that oversteps the front direction of the device is reduced. The device comprises a light source 2, a reflector 8, a waveguide 3 that receives through its side surfaces the light having been outputted by the light source 2 and reflected by the reflector 8, an output light modulator 6 as provided on the light output surface of the waveguide 3 to modulate the output light from the light output surface of the waveguide 3 toward the front direction of the light output surface, and an input light modulator 9 as provide between the light source 2 and the side surface of the waveguide 3 to modulate the output light from the light source 2 toward the light output surface of the waveguide 3 or toward the back surface of the waveguide 3 opposite to the light output surface thereof.

40 Claims, 15 Drawing Sheets

9 INPUT LIGHT MODULATOR

A LUMINANCE ANGLE DISTRIBUTION

9 INPUT LIGHT MODULATOR

PANEL LIGHT SOURCE DEVICE AND DISPLAY COMPRISING IT

FIELD OF THE INVENTION

The present invention relates to a panel light source device to be used in personal computers, computer monitors, video cameras, TV receivers, car navigation systems and the like, and to a direct-view display comprising it.

BACKGROUND OF THE INVENTION

Transmission displays such as typically liquid-crystal panels comprise a backlight that emits light in area and a display panel that comprises an array of dot pixels, in which letters and images are displayed through modulation of the light transmittance of each pixel of the display panel. The backlight includes, for example, one which comprises a combination of a halogen lamp, a reflector and a lens capable of modulating the luminance distribution of the outgoing light; one which comprises a waveguide and fluorescent tubes as disposed adjacent to the side surfaces of the waveguide and in which the light from the fluorescent tubes enters the waveguide and goes out through the surface of the waveguide perpendicular to the side surfaces thereof; and one which comprises a waveguide and a fluorescent tube as disposed inside the waveguide (direct backlight). The backlight employing a halogen lamp is used essentially in liquid-crystal projectors that require high luminance. On the other hand, the backlight employing a waveguide can be thinned and is much used in direct-view displays for liquid-crystal TVs, personal computers, etc.

It is desired that backlights for use in liquid-crystal TVs, notebook-size personal computers and the like consume reduced power while producing high luminance. For this, increasing the number of light sources such as cold cathode fluorescent lamps in backlights could realize the increase in the luminance to be produced, which, however, is not practicable as resulting in the increase in the power consumption by backlights.

On the other hand, the range of viewing angles for liquid-crystal panels is extremely narrow. At high viewing angles, or that is, large angles from the direction normal to the surface of the display (that is, from the direction just in front of the display surface), liquid-crystal panels exhibit low contrast and even changes in visual chromaticity and produce impractical images. Specifically, in liquid-crystal panels, the light being outputted in the oblique direction relative to the display surface is not utilized for viewing the display surface, and the degree of light utilization in liquid-crystal displays is not always high.

To solve the problem in the art, a backlight structure has been developed, which comprises a slab waveguide and light sources such as cold cathode fluorescent lamps or the like as disposed adjacent to the both side surfaces of the slab waveguide and in which a light diffuser and a prism sheet are provided above the slab waveguide (see Japanese Patent Application Laid-Open (JP-A) Hei-6-3667 and Hei-6-67004). Apart from this, another technique has been proposed of using two prism sheets as overlapped with each other in such a manner that their patterns are perpendicular to each other for two-dimensionally modulating the light passing through them. The backlight structures of those types will be effective in increasing the luminance of the light being outputted in the direction normal to their front surface, but are still defective in that the light being outputted at angles in the oblique direction overstepping the direction normal to the light output surface of the backlight still has relatively high luminance (the light of this type is hereinunder referred to as a side peak). In order to reduce the side peak, the angles at which light is outputted must be broadened, which, however, inevitably results in the decrease in the luminance of the outgoing light.

JP-A Hei-8-221013 discloses a backlighting apparatus comprising a first waveguide 23 and a second waveguide 24 as disposed adjacent to the surface of the first waveguide 23, as in FIG. 16, in which the light from the light sources 21 having been reflected by the reflector 22 and entering into the first waveguide 23 through its side surfaces is transmitted toward the front surface of the display panel. In this backlighting apparatus, however, the light having entered the first waveguide 23 in the direction perpendicular to one side surface of the first waveguide 23 directly passes inside the first waveguide 23 toward the other side surface, without going toward the second waveguide 24. Therefore, the light availability through the backlighting apparatus is not high. In addition, the light being outputted by the backlighting apparatus is not polarized. Therefore, in the combination of the backlighting apparatus and the transmission liquid-crystal panel 25, as in FIG. 16, the component of light being polarized by the polarizer 26 as disposed on the light input surface of the panel 25, in the direction that is the same as the direction of the absorption axis of the polarizer 26 is absorbed by the polarizer 26, thereby resulting in that the luminance of the backlighting apparatus is decreased by 50%. For these reasons, the backlighting apparatus could not realize sufficient light availability.

SUMMARY OF THE INVENTION

The present invention has been made in consideration of the problems in the art noted above, and its object is to provide a panel light source device of such that the luminance of light to be outputted in the oblique direction that oversteps the front direction of the device is reduced to thereby increase the light availability through the device. Another object of the invention is to provide a display which comprises the panel light source device and has high luminance.

The panel light source device of the invention that attains the first object comprises a light source, a reflector, a waveguide that receives through its side surfaces the light having been outputted by the light source and reflected by the reflector, an output light modulator as provided on the light output surface of the waveguide to modulate the output light from the light output surface of the waveguide toward the front direction of the light output surface, and an input light modulator as provided between the light source and the side surface of the waveguide to modulate the output light from the light source toward the light output surface of the waveguide or toward the back surface of the waveguide opposite to the light output surface thereof.

In the panel light source device of the invention, two input light modulators each having a periodically jagged surface may be so combined and disposed between the light source and the side surface of the waveguide that the grating pattern of the periodically jagged surface of one input light modulator is perpendicular to that of the periodically jagged surface of the other.

Also in the device, the input light modulator having a periodically jagged surface and a polarizing means may be disposed between the light source and the side surface of the waveguide.

The display of the invention that attain the second object noted above comprises a panel light source device and a display device, in which the panel light source device comprises a light source, a reflector, a waveguide that receives through its side surfaces the light having been outputted by the light source and reflected by the reflector, an input light modulator as provided between the light source and the side surface of the waveguide to modulate the output light from the light source toward the light output surface of the waveguide or toward the back surface of the waveguide opposite to the light output surface thereof, and an output light modulator as provided on the light output surface of the waveguide to modulate the output light from the light output surface of the waveguide toward the front direction of the light output surface. In this, the display device may be a liquid-crystal panel.

In the display of the invention having the structure noted above, a polarizing means may be provided between the light source and the side surface of the waveguide. In that type where the polarizing means is to pass circular polarized light in a specific direction, a quater-wave plate may be provided between the waveguide and the display device.

DESCRIPTION OF PREFERRED EMBODIMENTS OF THE INVENTION

Figure 1A:
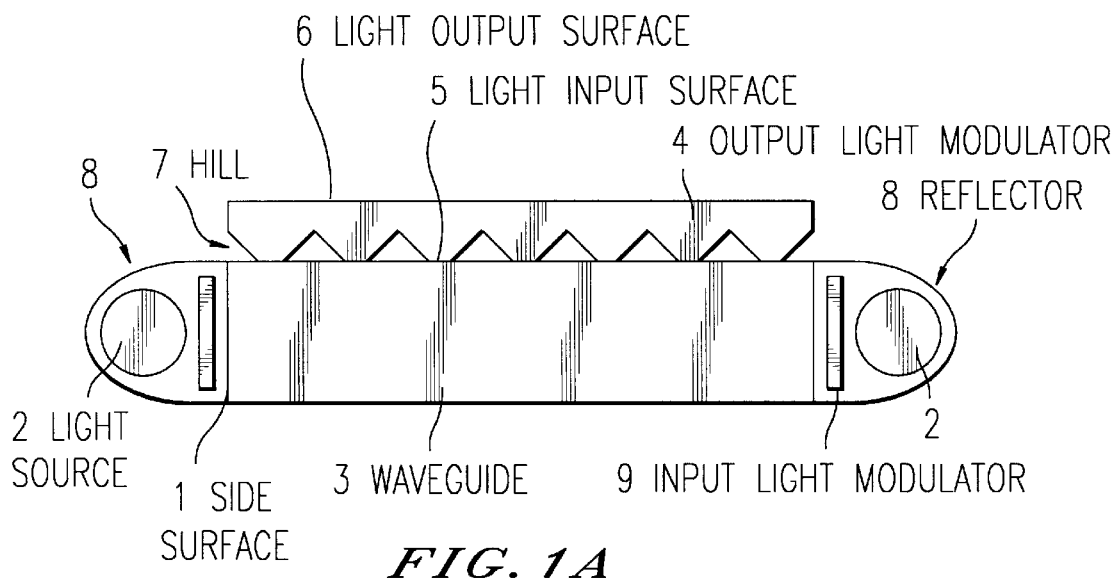
FIG. 1(a) to FIG. 1(c) are graphic views showing the outline of different embodiments of the panel light source of the invention.

FIG. 1(a) is a graphic view showing the outline of one embodiment of the panel light source device of the present invention. The panel light source device illustrated comprises a waveguide 3, light sources 2 as disposed adjacent to the both side surfaces 1 of the waveguide 3 via an input light modulator 9 therebetween, and an output light modulator 4 for modulating the distribution of the outgoing angles of the light being outputted through the waveguide 3. The output light modulator 4 is disposed above the waveguide 3, and the light having entered the light input surface 5 of the modulator 4 goes out therethrough from the light output surface 6. The modulator 4 has many hills 7 on its light input surface 5, and the tip of each hill 7 is kept in close contact with the light output surface of the waveguide 3. Around the light sources 2, provided is a reflector 8, by which light going in the direction opposite to the direction toward the side surfaces of the waveguide is reflected to go toward each side surface of the waveguide. The input light modulator 9 is disposed between the waveguide 3 and each light source 2, which modulates the distribution of the light angles toward the waveguide 3 from each light source 2. Specifically, the modulator 9 modulates the distribution of the light angles in the direction perpendicular to the light output surface of the waveguide 3 (in FIG. 1(a), in the vertical direction).

Figure 2A:
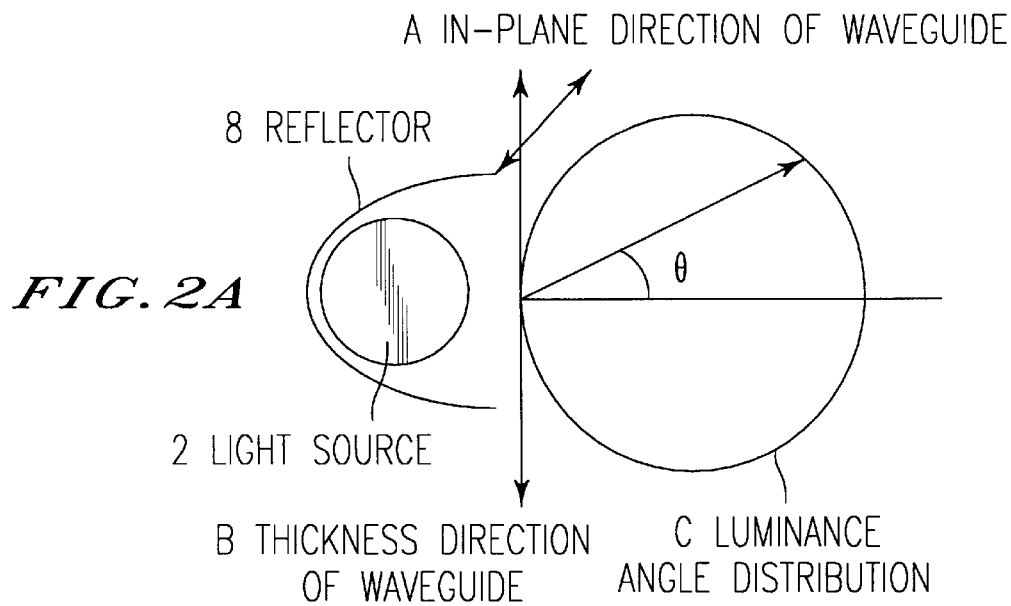
FIG. 2(a) to FIG. 2(c) are graphic views indicating the luminance angle distribution in the absence or presence of input light modulator(s).

The function of the input light modulator noted above is described with reference to FIG. 2(a) to FIG. 2(c), in which the size of the circle for the luminance angle distribution indicates the degree of luminance. In the absence of the input light modulator, the luminance distribution of light entering the side surface of the waveguide is in a diffused condition as in FIG. 2(a). In this case, light at an angle θ=0°, or that is, light entering the side surface of the waveguide in the direction perpendicular thereto shall directly reach the other side surface of the waveguide. Accordingly, in this case, light entering the waveguide in the direction perpendicular to the side surface of the waveguide could not go out through the waveguide, and produces light loss. Disposing the input light modulator adjacent to the side surface of the waveguide in such a manner that the grating surface of the modulator faces the side surface of the waveguide and that the grating ridges on the modulator are in the lengthwise direction of the light source, whereby the luminance of light being outputted through the input light modulator in the direction toward the front surface of the modulator is lowered while light being outputted therethrough in the oblique direction relative to the front surface of the modulator is increased, changes the luminance distribution of the light which enters the side surface of the waveguide to that shown in FIG. 2(b). In that manner, the light loss is reduced. The input light modulator to be used for that purpose may be a diffraction grating having a periodically jagged surface.

Figure 3A:
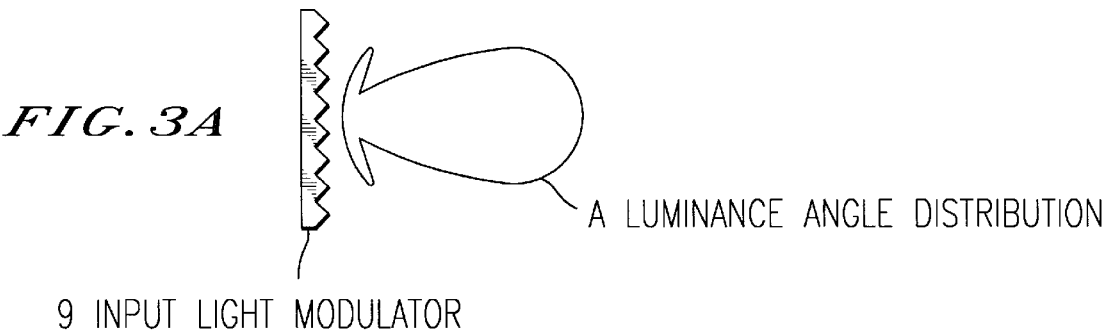
FIG. 3(a) and FIG. 3(b) are graphic views showing the arrangement of an input light modulator of which the grating surface faces the side surface of the waveguide.
Figure 3B:
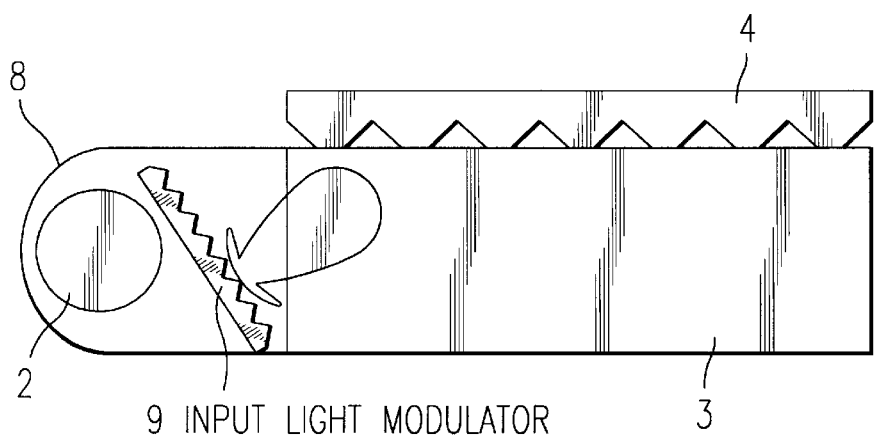

So far as it gives the luminance distribution defined as above, the input light modulator may be so positioned in any way that its grating surface faces either the light source or the side surface of the waveguide. Further so far as it gives the intended luminance distribution as above, the input light modulator may be so positioned in any way that the angle of the light having passed through the modulator and having entered the waveguide, to the light output surface of the waveguide or to the back surface thereof (opposite to the light input surface) may be either narrow or wide. Where a prism array of which the vertical angle of each grating is 90° is disposed in such a manner that its grating surface faces the side surface of the waveguide and where light is applied to the prism array (input light modulator) at its surface (back surface) opposite to the grating surface, the prism array gives the luminance distribution as in FIG. 3(a). Accordingly, as in FIG. 3(b), where the input light modulator 9 is so positioned adjacent to one side surface of the waveguide while being inclined relative to the side surface that the grating surface of the modulator 9 faces toward the light output surface of the waveguide, the proportion of the light that may reach the other side surface of the waveguide vertically thereto may be reduced, whereby the light availability through the waveguide may be increased.

Figure 1B:
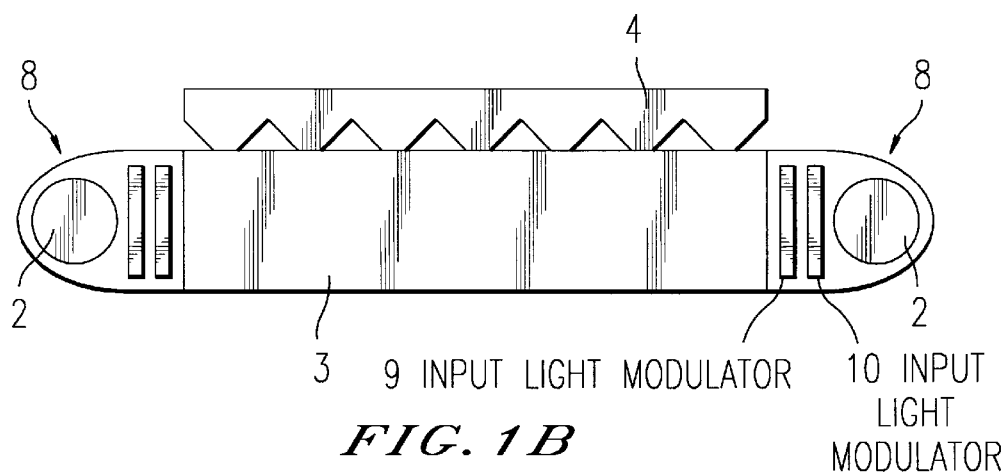
Figure 2B:
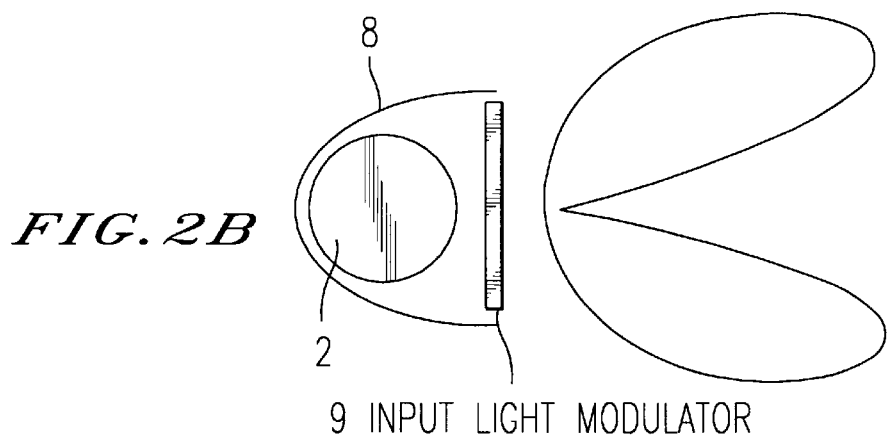
Figure 2C:
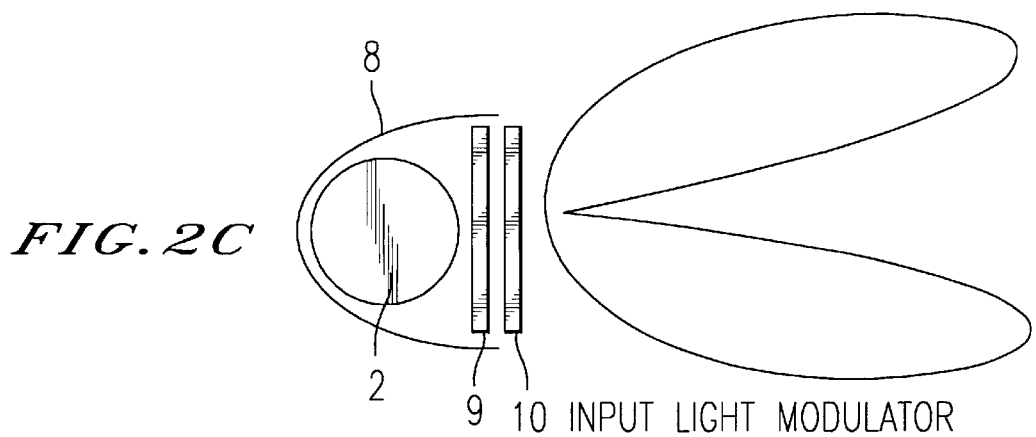

A second embodiment of the panel light source device of the present invention is shown in FIG. 1(b), in which the parts which are the same as those in FIG. 1(a) are represented by the same numeral references and their description is omitted. In this embodiment, two input light modulators 9 and 10 are disposed between the light source and the side surface of the waveguide. In this, the input light modulator 9 has the function as illustrated in FIG. 2(b). The second input light modulator 10 is, for example, a prism array of which the vertical angle of each grating is 90°. In the embodiment illustrated, the prism array of the second input light modulator is so positioned that its grating surface faces the side surface of the waveguide and that the ridge of each grating is perpendicular to the lengthwise direction of the light source. In other words, in this embodiment, the input light modulator 9 and the second input light modulator 10 are so positioned that the grating ridges of the former are perpendicular to those of the latter. So positioning the two input light modulators that their grating ridges are perpendicular to each other increases the light luminance in the oblique direction relative to the two input light modulators, whereby the luminance distribution of light that enters the waveguide through its side surface may be modulated as in FIG. 2(c).

Figure 4A:
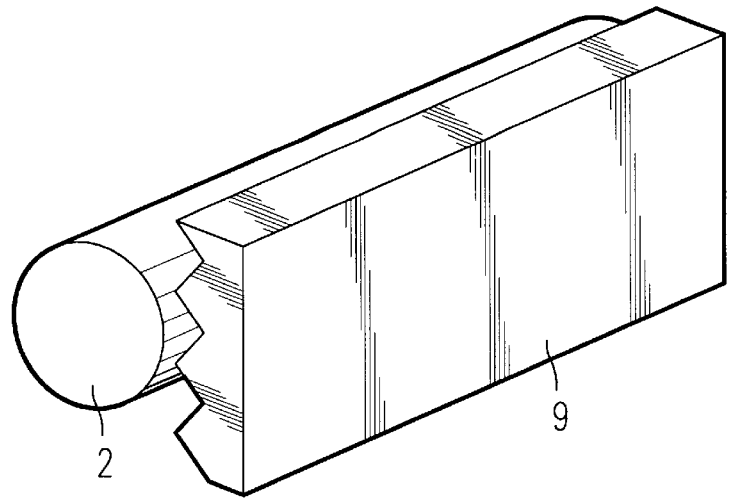
FIG. 4(a) to FIG. 4(c) are graphic views showing different arrangements of input light modulator(s).
Figure 4B:
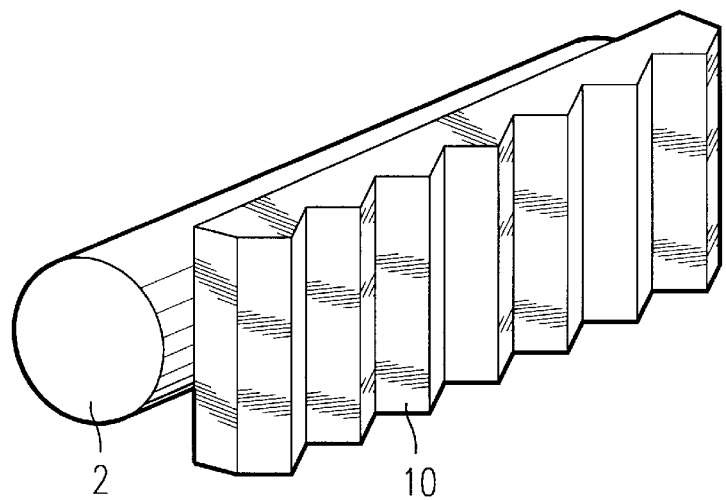
Figure 4C:
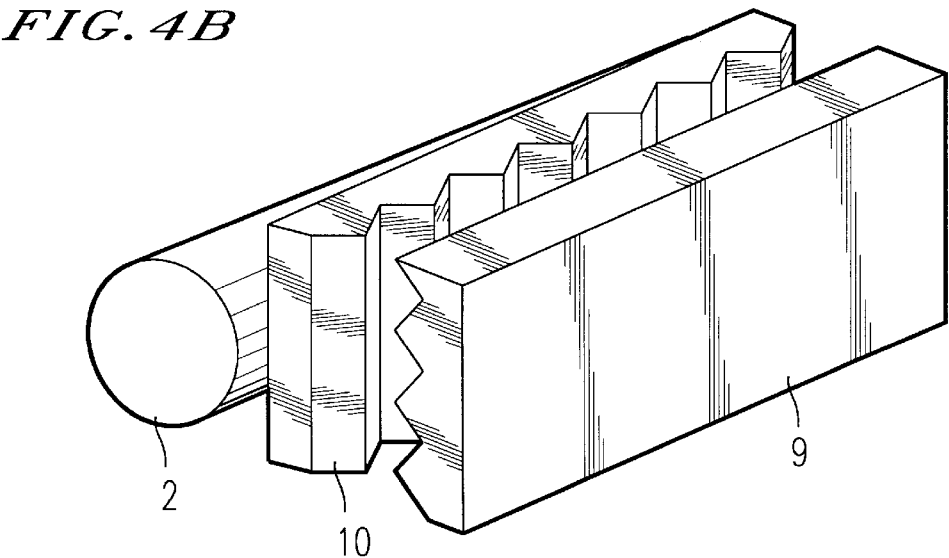
Figure 5A:
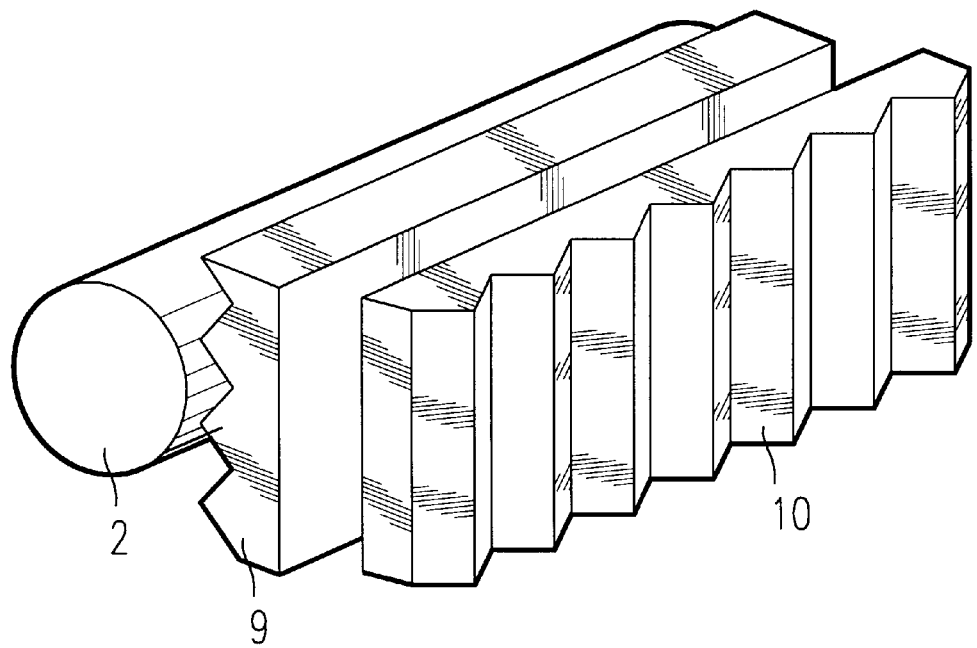
FIG. 5(a) and FIG. 5(b) are graphic views showing other different arrangements of input light modulators.
Figure 5B:
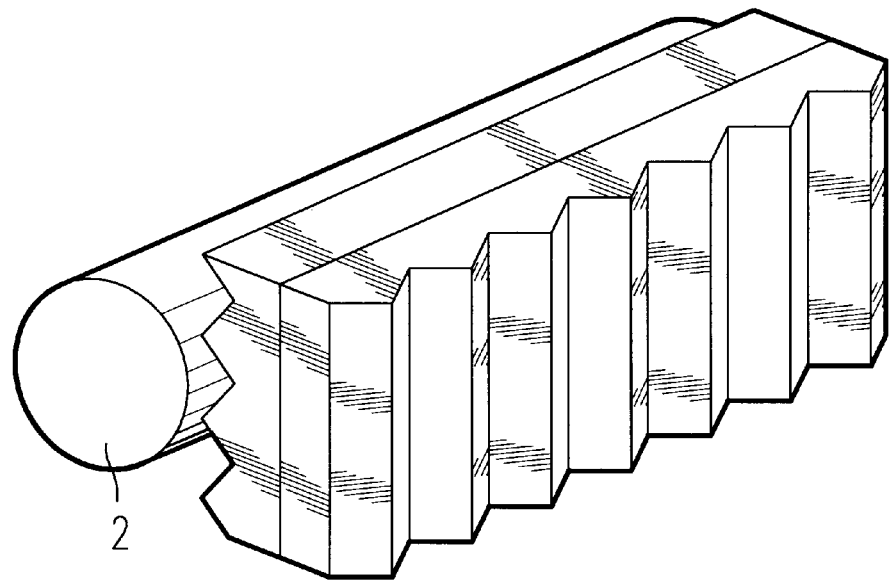

As so mentioned hereinabove, the input light modulator may be positioned between the side surface of the waveguide and the light source. In the device of the invention, one or more such input light modulators may be employed either singly or as combined. Therefore, taking the production costs and other parameters into consideration, any desired input light modulators may be selected and used in designing the device so that the designed device can exhibit the necessary effects. FIG. 4(a) to FIG. 4(c), and FIG. 5(a) and FIG. 5(b) show some arrangement embodiments of one or two input light modulators. In FIG. 4(a) and FIG. 4(b), used is one input light modulator. In FIG. 4(a), the grating surface of the input light modulator faces the light source, and the grating ridges are parallel to the lengthwise direction of the light source. In FIG. 4(b), the grating surface of the input light modulator faces the side surface of the waveguide, and the grating ridges are perpendicular to the lengthwise direction of the light source. In FIG. 4(c), FIG. 5(a) and FIG. 5(b), two input light modulators are combined. The arrangement of the input light modulators in FIG. 4(c) is opposite to that of the input light modulators in FIG. 5(a). Integrating the two input light modulators in FIG. 5(a) with the both grating surfaces facing outward gives the arrangement of FIG. 5(b) where the two input light modulators are integrated. As decreasing the two interfaces between air and the input light modulator, the constitution of FIG. 5(b) is advantageous in that the light loss to be caused by reflection on the interfaces is reduced whereby the light availability through the integrated input light modulator system is increased.

Figure 6A:
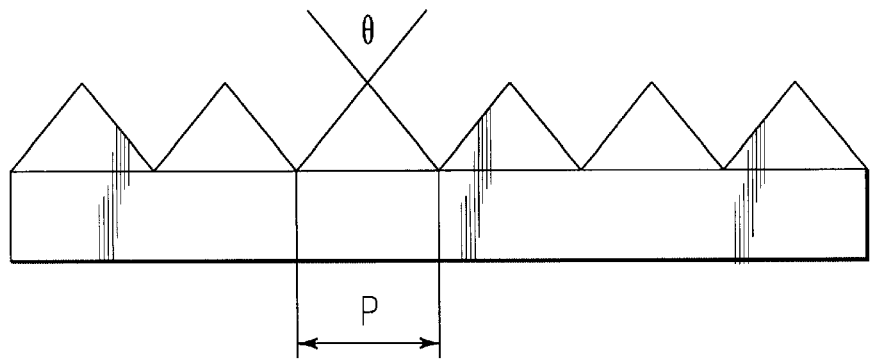
FIG. 6(a) to FIG. 6(d) are graphic views showing different modifications of the cross-sectional profile of an input light modulator.
Figure 6B:
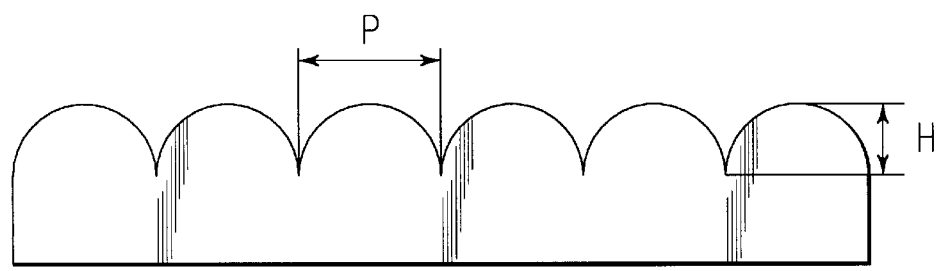
Figure 6C:
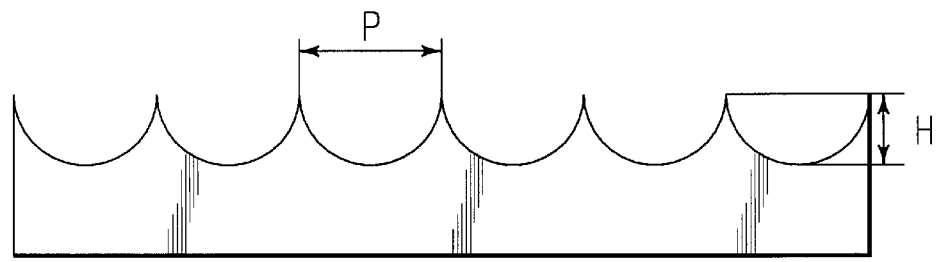
Figure 6D:
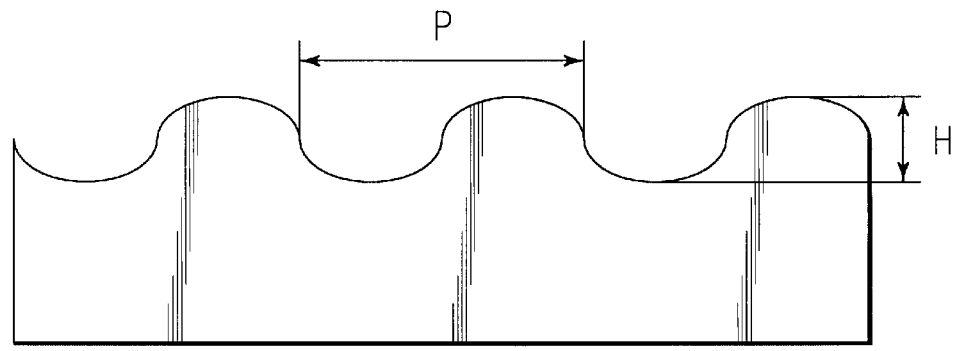

In the embodiments illustrated hereinabove, the cross-sectional profile of each grating of the input light modulator is a triangle having a vertical angle of 90°, which, however, is not limitative. Where the grating surface of the input light modulator faces the light source, the vertical angle, θ, of each grating (see FIG. 6(a)) may fall between 70° and 95° to produce good results. On the other hand, where the grating surface of the input light modulator faces the side surface of the waveguide, the vertical angle, θ, of each grating may fall between 70° and 110° to produce good results. The cross-sectional profile of each grating is not limited to only a triangular one, but may be in an arc as in FIG. 6(b) or FIG. 6(c). For the arc gratings, the ratio of the grating period, P, to the grating height, H, H/P is preferably from 0.1/1 to 0.7/1, but more preferably from 0.2/1 to 0.4/1. Apart from those, the cross-sectional profile of the gratings may be in wave, as in FIG. 6(d). For the wave gratings, the ratio of the grating period, P, to the grating height, H, H/P is preferably from 0.1/1 to 0.9/1, but more preferably from 0.2/1 to 0.6/1.

Figure 7A:
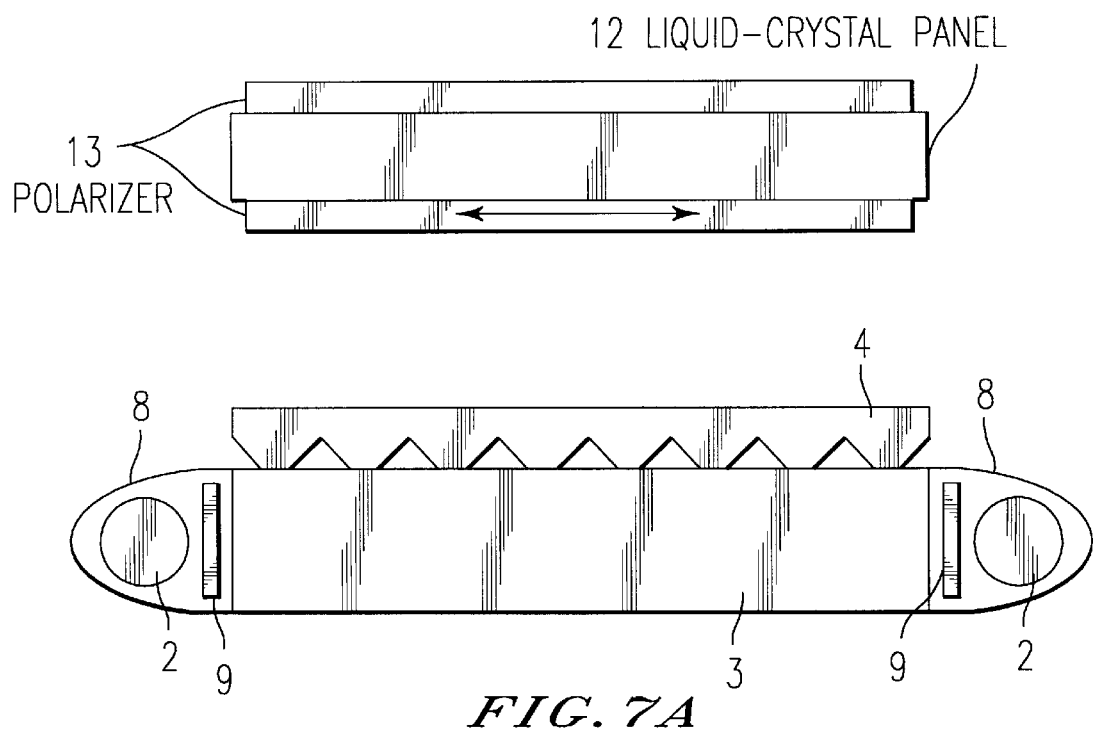
FIG. 7(a) and FIG. 7(b) are graphic views showing embodiments of the display that comprises the panel light source device of the invention.
Figure 7B:
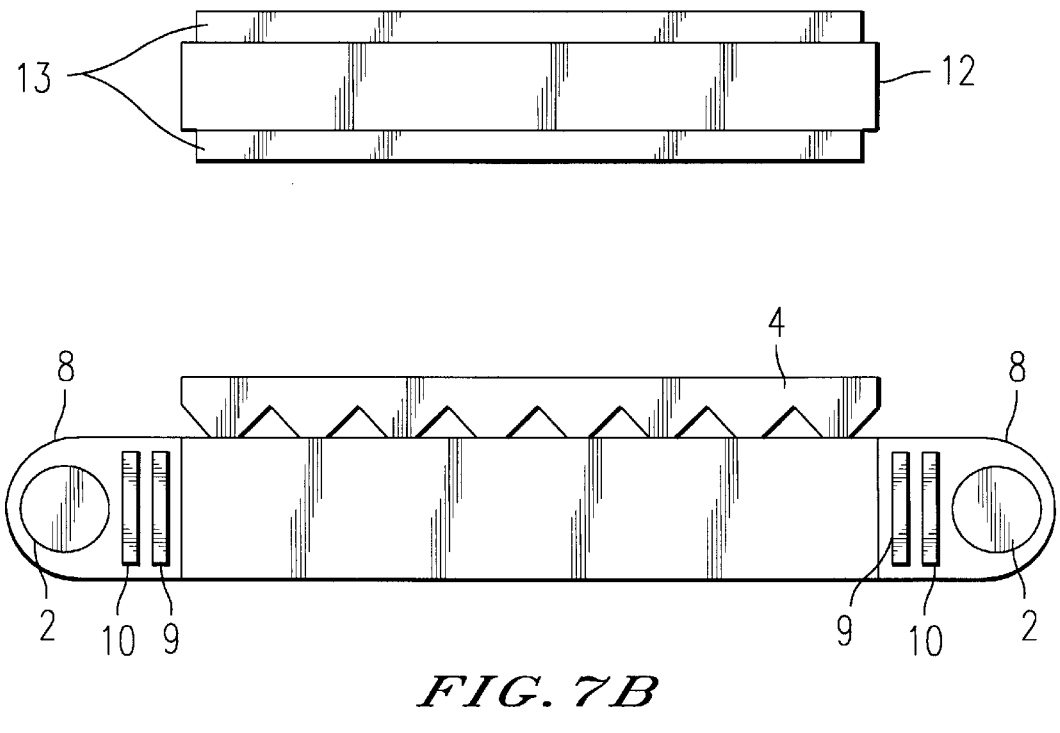

FIG. 7(a) and FIG. 7(b) are graphic views showing the outline of embodiments of the display of the invention that comprises the panel light source device mentioned hereinabove and a liquid-crystal display. In the embodiment of FIG. 7(a), the panel light source device comprises the light sources 2 and the waveguide 3, in which one input light modulator 9 is between the light source 2 and the side surface of the waveguide, and the device is combined with a liquid-crystal panel 12. A polarizer 13 is provided on the both surfaces of the liquid-crystal panel 12. In the embodiment of FIG. 7(b), the panel light source device comprises the light sources 2 and the waveguide 3, in which two input light modulators 9 and 10 are between the light source 2 and the side surface of the waveguide, and the device is combined with a liquid-crystal panel 12.

Figure 1C:
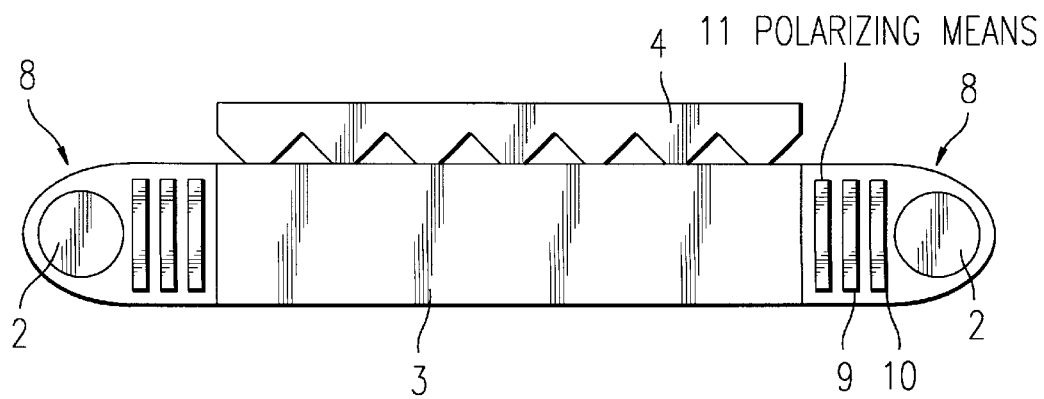

FIG. 1(c) shows a third embodiment of the panel light source device of the invention, in which the parts which are the same as those in FIG. 1(a) are represented by the same numeral references and their description is omitted. In this embodiment, two input light modulators 9 and 10 and one polarizing means 11 are disposed between the light source 2 and the side surface of the waveguide 3.

Figure 15A:
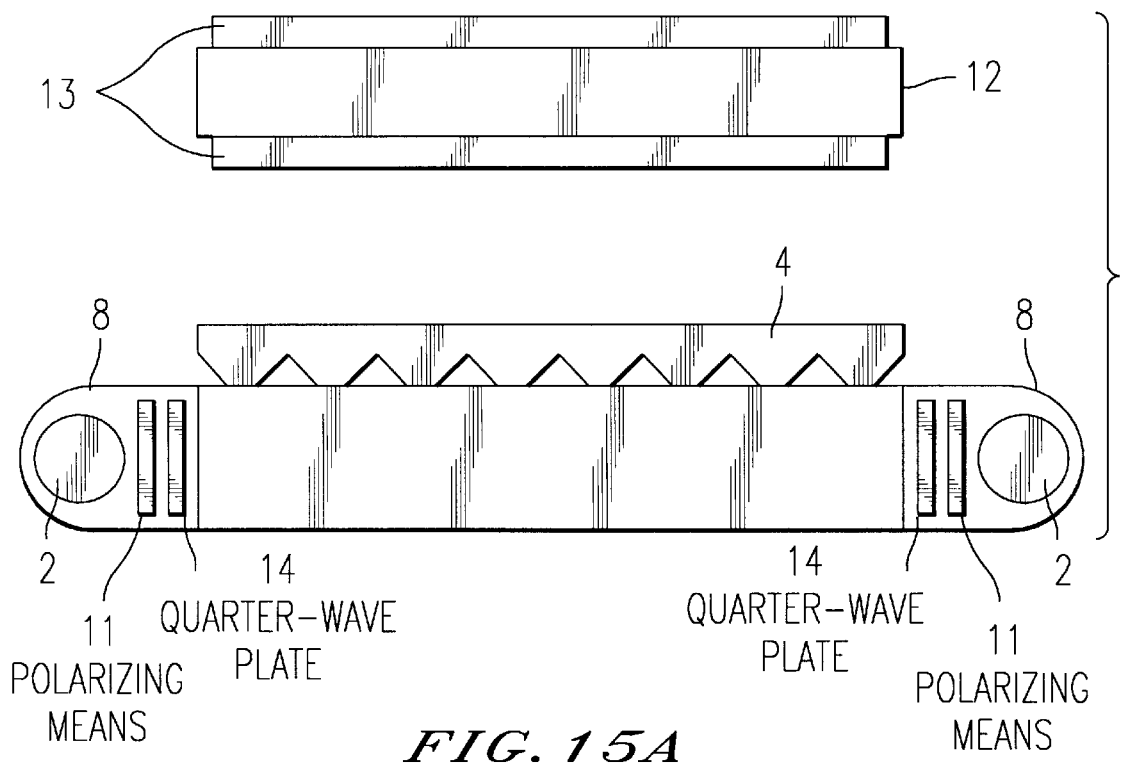
FIG. 15(a) and FIG. 15(b) are graphic views showing embodiments of the display that comprises the panel light source device.
Figure 15B:
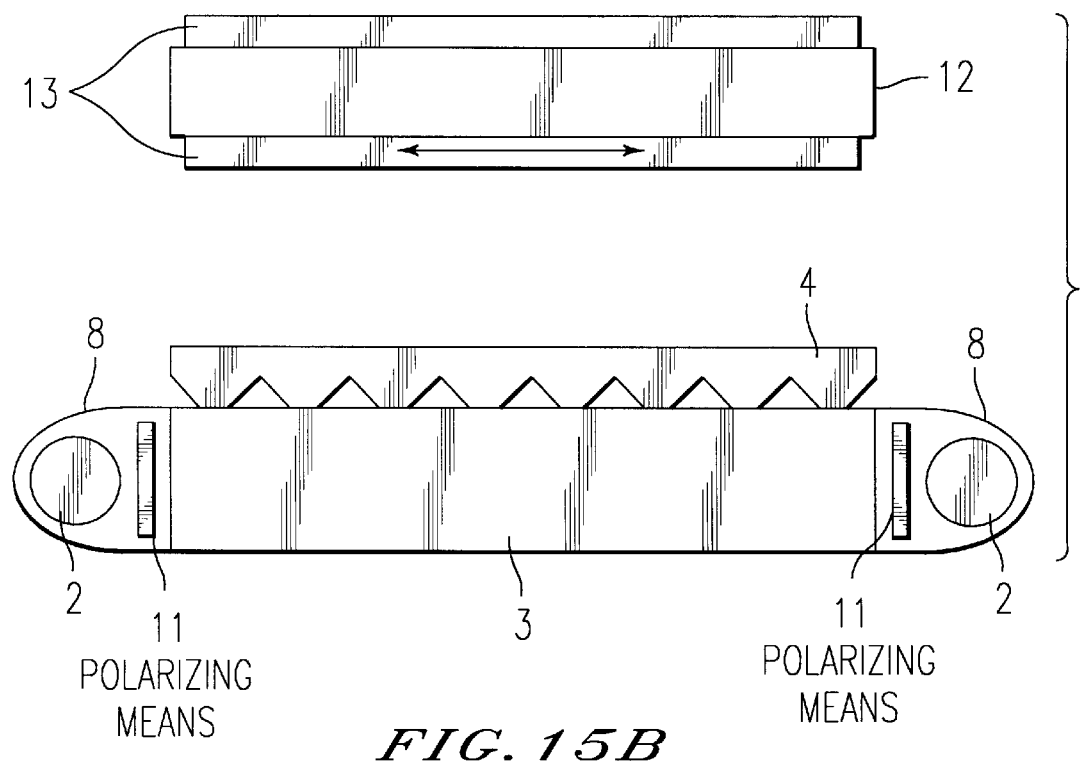
Figure 16:
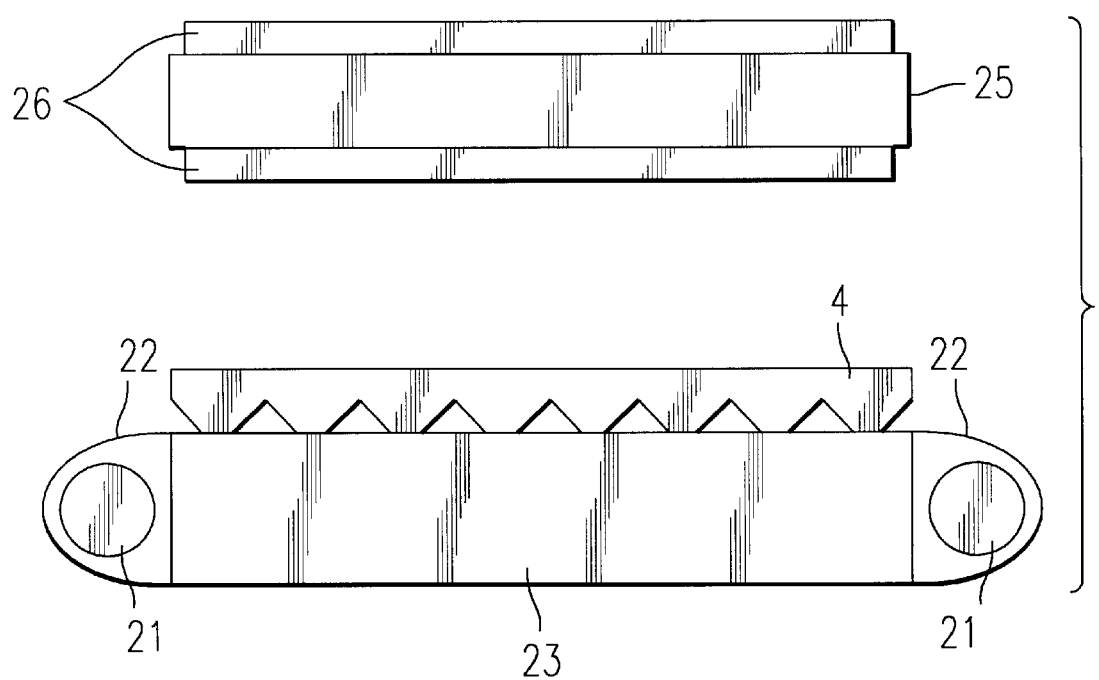
FIG. 16 is a graphic view showing the outline of a display that comprises a conventional panel light source device.

In the present invention, (a) the polarizing means having the function to transmit and reflect a circular polarized light and to convert the output light into a linear polarized light via a quater-wave plate provided adjacent to the light output surface of the polarizing means or to the light input surface of the liquid-crystal panel, or (b) the polarizing means having the function to transmit and reflect a linear polarized light may be used. For example, a MERCK'polarizing film (trade name: Trans Max) may be used as the type of said polarizing means (a). And a 3M'thin reflective polarizing film (trade name: DBEF) may be used as the type of said polarizing means (b) for example. The light having been outputted by the light source 2 is a non-polarized condition, but the light having passed through the polarizing means 11 is in a polarized condition of a specific polarized component. The light having been reflected by the polarizing means 11 is reflected by the reflector 8 and again enters the polarizing means 11. Accordingly, the energy loss in the constitution of this embodiment is small. Disposing the polarizing means 11 therein makes it possible to introduce a specific polarized light into the waveguide 3. The specific polarized light passes through the waveguide 3 and goes out of the device through the output light modulator 4. Since the light is subjected to total reflection and refraction only in the device prior to being outputted, its polarized condition does not vary. Combining the panel light source device of this type with a liquid-crystal panel to construct a display, in such a manner that the transmission axis direction of the polarizer on the light input surface of the liquid-crystal panel may be parallel to the linear polarizing direction of the output light from the panel light source device, increases the luminance of the thus-constructed display. Further in the presence of the types of said polarizing means (a) or (b), input light modulator may not be provided between the light source and the side surface of the waveguide. That is, (a) a panel light source device may be comprised by a light source, a reflector, a waveguide that receives through its side surfaces the light having been outputted by the light source and reflected by the reflector, an output light modulator as provided on the light output surface of the waveguide to modulate the output light from the light output surface of the waveguide toward the front direction of the light output surface, and a polarizing means having a function to transmit and reflect a specific circular polarized light and to convert the output light into a linear polarized light via a quater-wave plate provided adjacent to the light output surface of the polarizing means (as shown in FIG. 15(a)). Or (b) a panel light source device may be comprised by a light source, a reflector, a waveguide that receives through its side surfaces the light having been outputted by the light source and reflected by the reflector, an output light modulator as provided on the light output surface of the waveguide to modulate the output light from the light output surface of the waveguide toward the front direction of the light output surface, and a polarizing means having a function to transmit a specific linear polarized light and to reflect a remaining linear polarized light (as shown in FIG. 15(b)).

Figure 8A:
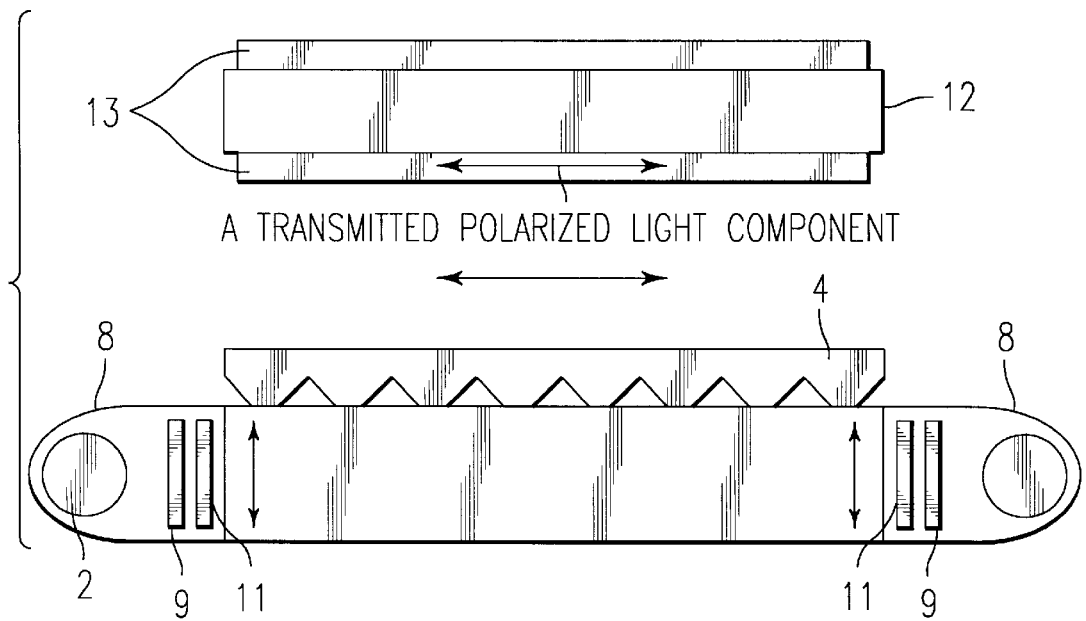
FIG. 8(a) and FIG. 8(b) are graphic views showing other embodiments of the display that comprises the panel light source device of the invention.

FIG. 8(a) shows the outline of one embodiment of the display of the invention that comprises a combination of the panel light source device of FIG. 1(c) and a liquid-crystal panel. In this embodiment, a polarizer 13 is provided on the both surfaces of the liquid-crystal panel 12. In this, the liquid-crystal panel may be combined with the panel light source device in such a manner that the transmission axis of the polarizer 13 on the light input surface of the liquid-crystal panel is so aligned that only the polarized light having been outputted by the panel light source device passes through the liquid-crystal panel, whereby the light absorption by the polarizer 13 is reduced and the light availability through the liquid-crystal panel is increased.

Figure 8B:
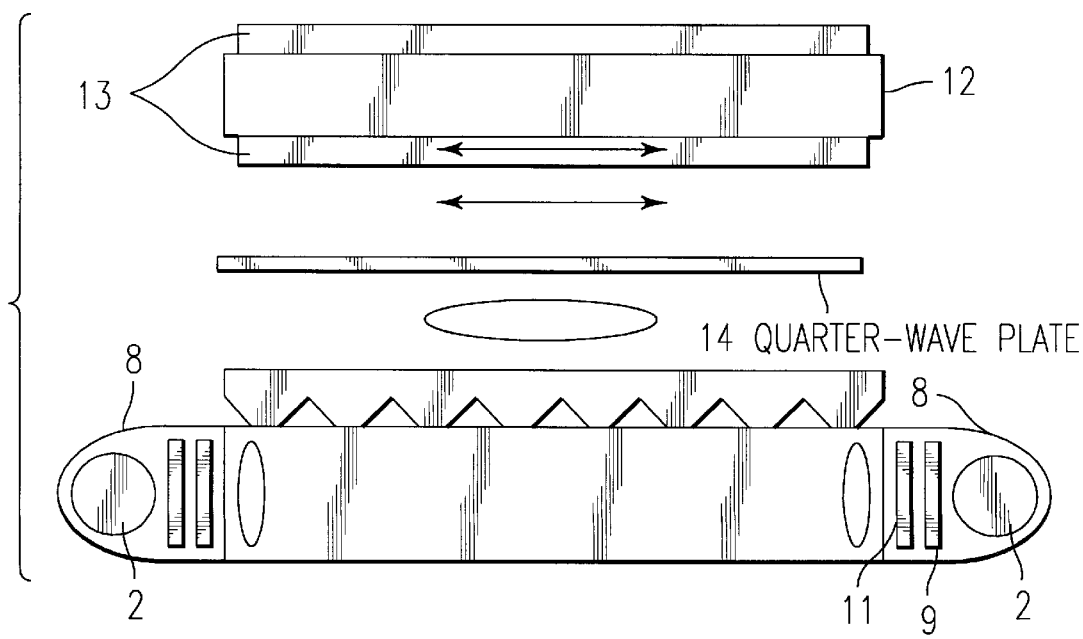

As the polarizing means, also employable is one having the function to transmit and reflect a circular polarized light. In the absence of the quater-wave plate on the light output surface of the polarizing means, a circular polarized light is outputted by the panel light source device. FIG. 8(b) is a graphic view showing the outline of one embodiment of the display of the invention, which comprises the panel light source device having the function to transmit and reflect a circular polarized light, and a liquid-crystal panel, and a quater-wave plate as put therebetween. In this embodiment, disposed is the quater-wave plate 14 on the light output surface of the panel light source device, and the output light of being a circular polarized light is converted into a linear polarized light through the quater-wave plate 14. In this, the polarized direction of the linear polarized light can be controlled, depending on the position of the quater-wave plate 14. Therefore, in this, where light from the panel light source device is inputted into the liquid-crystal panel 12, which has the polarizer 13 having the function to transmit a linear polarizing light therethrough on the light input surface of the panel 12, the polarizing direction of the quater-wave plate 14 may be aligned so as to increase the amount of the input light.

Figure 9A:
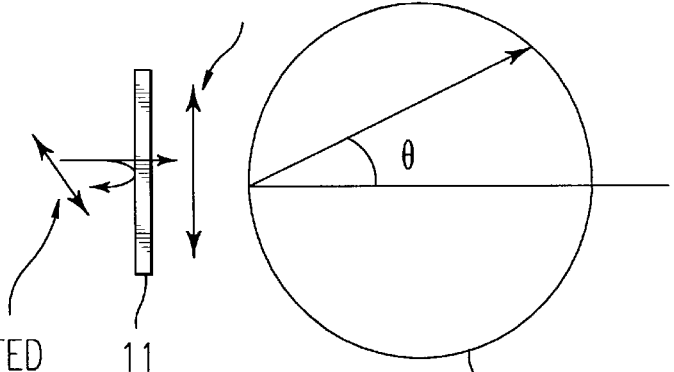
FIG. 9(a) to FIG. 9(c) are graphic views showing different conditions of light entering a waveguide in the presence of a polarizing means or of a polarizing means as combined with input light modulator(s).
Figure 9B:
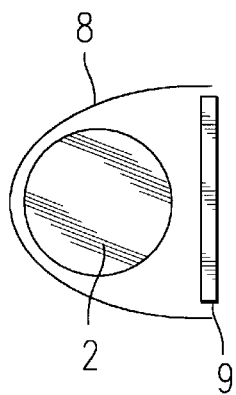
Figure 9C:
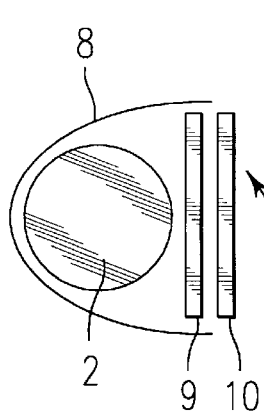

The polarizing means may be combined with an input light modulator, in place of being used singly. The effect to be produced by the combination of the polarizing means with the input light modulator is described with reference to FIG. 9(a) to FIG. 9(c), in which the size of the circle for the luminance angle distribution indicates the degree of luminance. In these, the polarizing means used can transmit a specific linear polarized light component while reflecting the remaining polarized light component. In the absence of the input light modulator between the light source 2 and the side surface of the waveguide 3, as in FIG. 9(a), produced is the angle distribution as illustrated. Being different from this, where the input light modulator 9 is disposed between the light source 2 and the side surface of the waveguide 3, as in FIG. 9(b), the luminance distribution produced is in the polarized condition as illustrated. In still another embodiment, where two input light modulators 9 and 10 are disposed between the light source 2 and the side surface of the waveguide 3 in such a manner that the grating ridges of the two modulators are perpendicular to each other, the luminance of the light being outputted in the oblique direction relative to the modulators may be much increased. In this, as in FIG. 9(c), the luminance distribution is modulated to be in the polarized condition as illustrated. Combining the polarizing means with one or more input light modulators in the manner illustrated above is effective for further improving the light availability through the panel light source device of the invention.

Figure 10A:
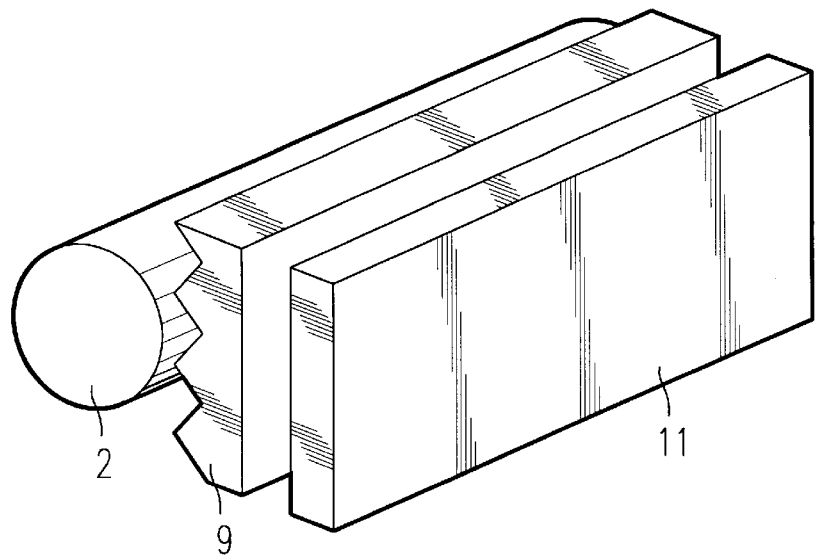
FIG. 10(a) to FIG. 10(c) are graphic views showing different modifications of the combination of an input light modulator and a polarizing means.
Figure 10B:
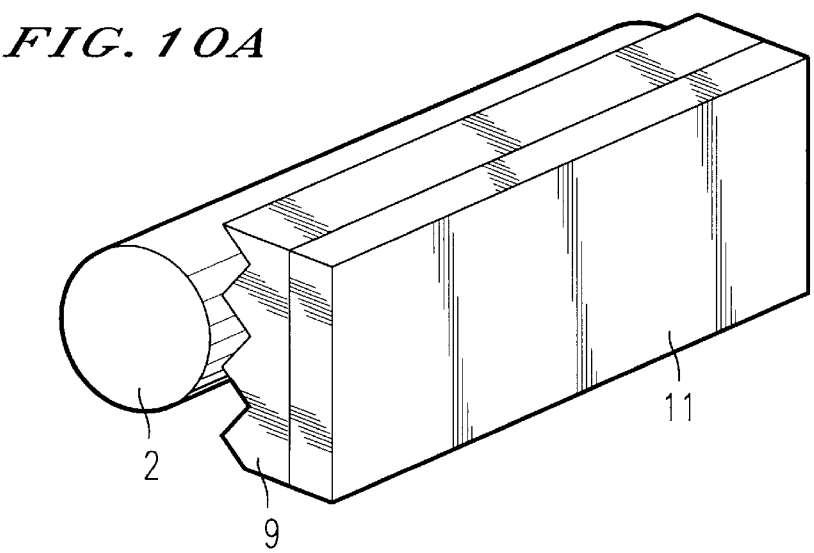
Figure 10C:
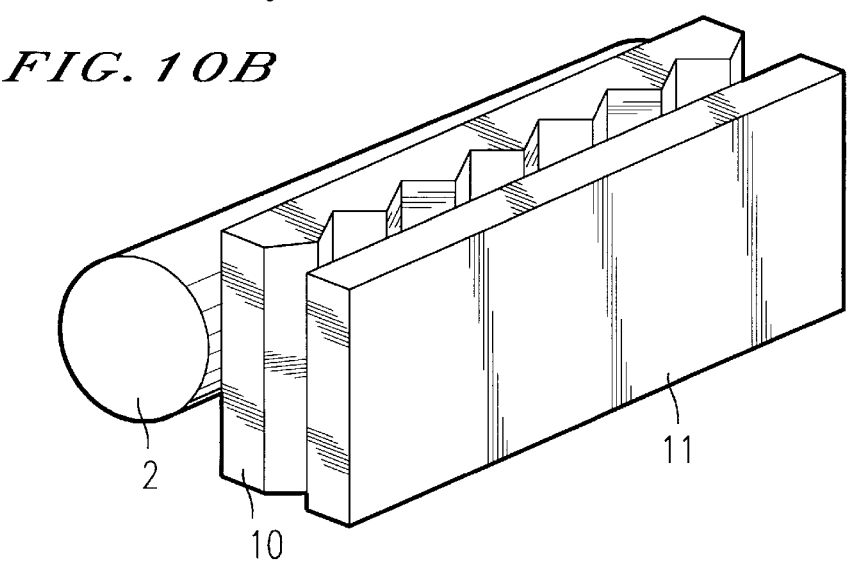
Figure 11A:
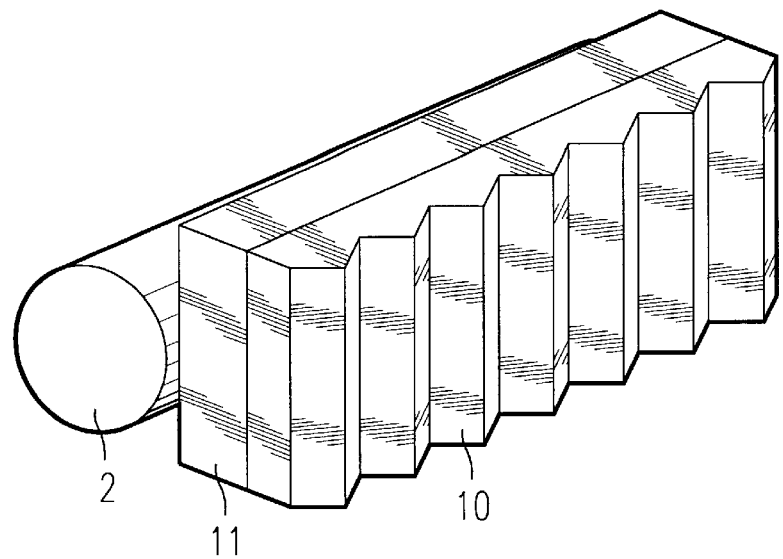
FIG. 11(a) to FIG. 11(c) are graphic views showing other different modifications of the combination of input light modulator(s) and a polarizing means.
Figure 11B:
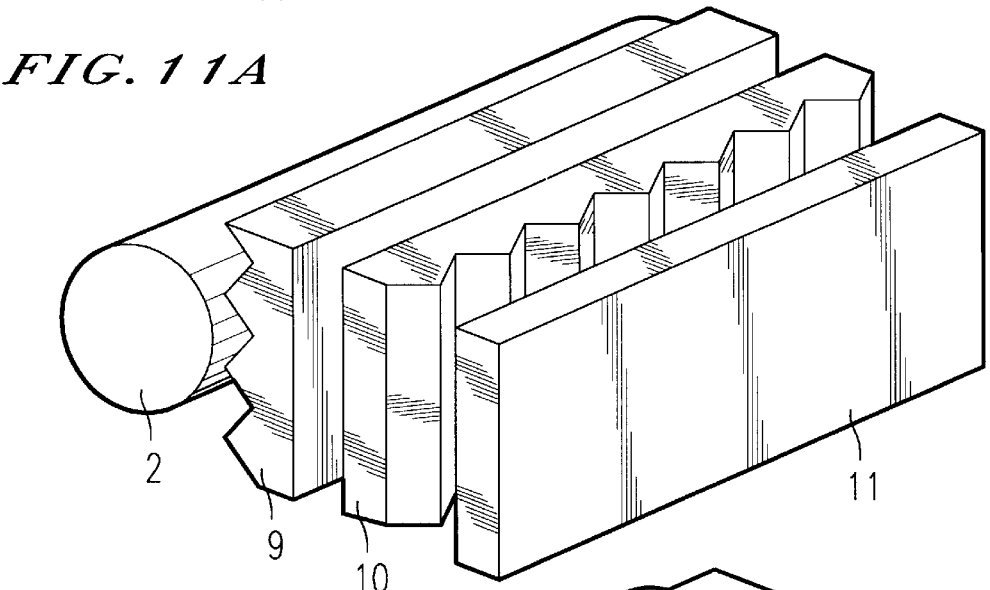
Figure 11C:
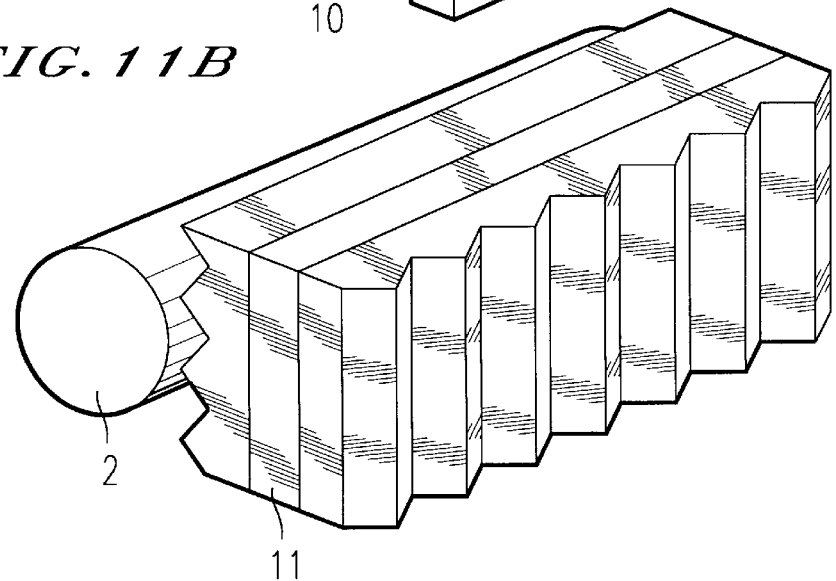
Figure 12A:
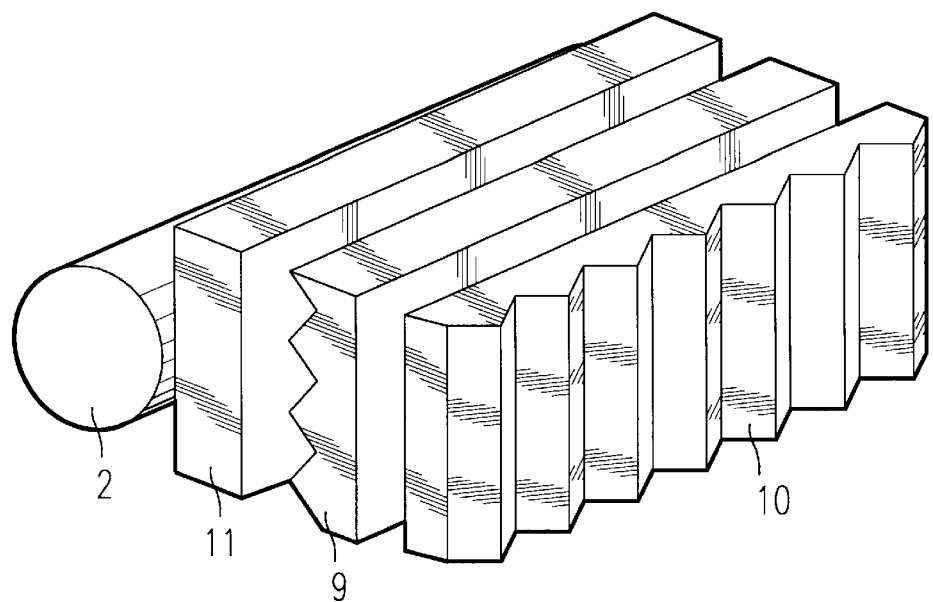
FIG. 12(a) to FIG. 12(c) are graphic views showing still other different modifications of the combination of input light modulators and a polarizing means.
Figure 12B:
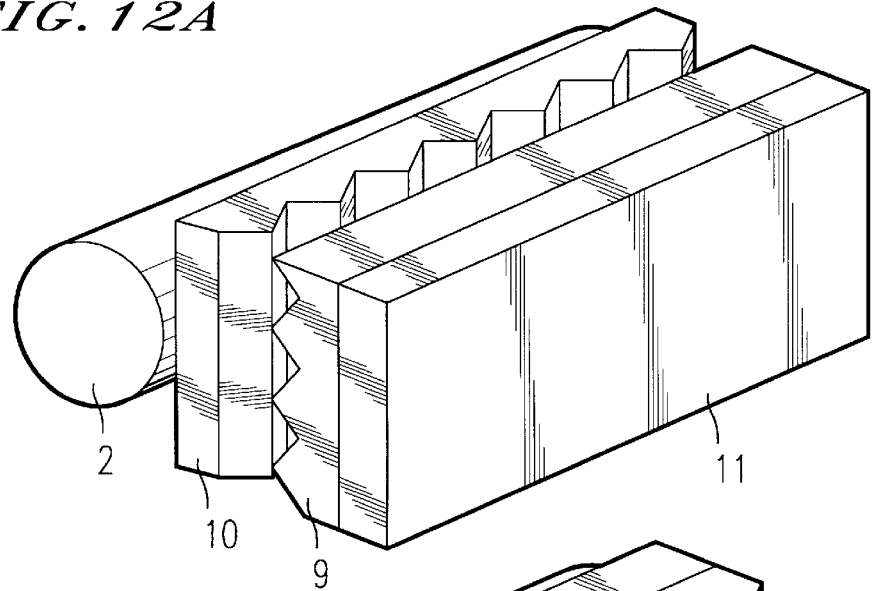
Figure 12C:
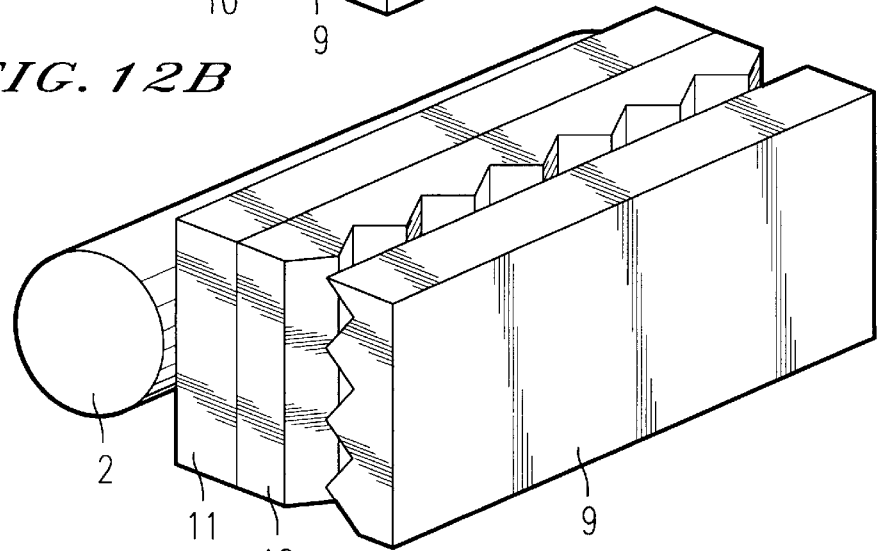

FIG. 10(a) to FIG. 10(c), FIG. 11(a) to FIG. 11(c), and FIG. 12(a) to FIG. 12(c) show various embodiments of the combination of the polarizing means and one or two input light modulators. As in FIG. 10(a) to FIG. 10(c) and FIG. 11(a) to FIG. 11(c), the grating surface of the input light modulator may face either the light source or the side surface of the waveguide. In FIG. 10(a), the grating surface of the input light modulator faces the light source, while the grating ridges thereof are parallel to the lengthwise direction of the light source, and the input light modulator is separated from the polarizing means. In FIG. 10(b), the input light modulator is integrated with the polarizing means thereby reducing the light loss to be caused by the reflection on the interface between the two. In a different modification of the constitution of FIG. 10(b), the polarizing means may be positioned between the light source and the input light modulator. In the embodiments of FIG. 10(c) and FIG. 11(a), the input light modulator is so combined with the polarizing means that the grating surface of the input light modulator faces the side surface of the waveguide while the grating ridges thereof are perpendicular to the lengthwise direction of the light source. In FIG. 10(c), the light source, the input light modulator and the polarizing means are separately disposed in that order. In FIG. 11(a), the light source, the polarizing means and the input light modulator are disposed in that order while the polarizing means is integrated with the input light modulator. In the embodiments of FIG. 11(b), FIG. 11(c) and FIG. 12(a) to FIG. 12(c), two input light modulators are combined with one polarizing means. In FIG. 11(b) and FIG. 12(a), they are separately disposed. In FIG. 11(c), FIG. 12(b) and FIG. 12(c), they are completely or partially integrated. For the combination of the polarizing means and the input light modulator, any different arrangements other than those illustrated herein are employable in accordance with the necessary characteristics of the device of the invention including the luminous distribution and the polarized condition to be produced therein.

Figure 13A:
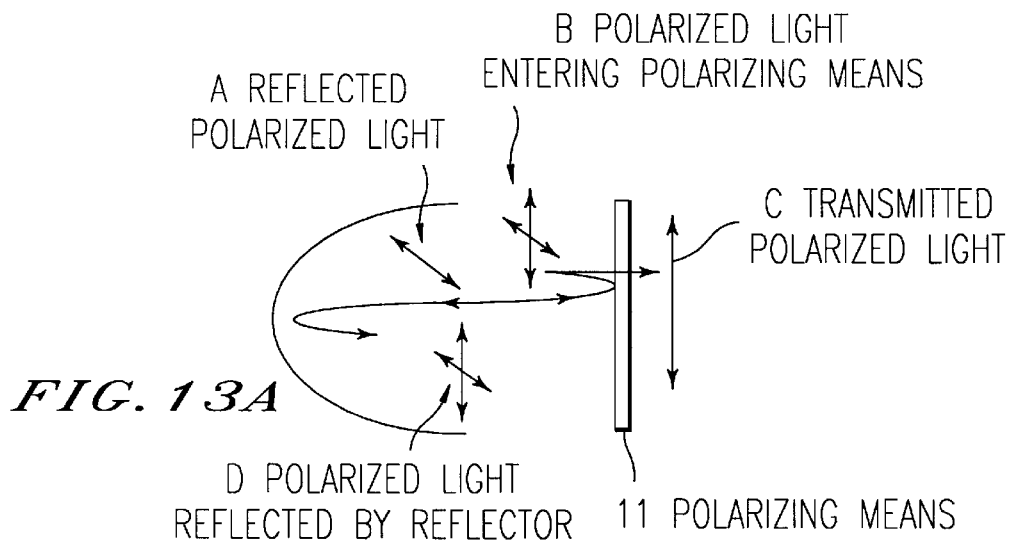
FIG. 13(a) and FIG. 13(b) are graphic views showing different conditions of a polarized light as reflected by or passing through a polarizing means.
Figure 13B:
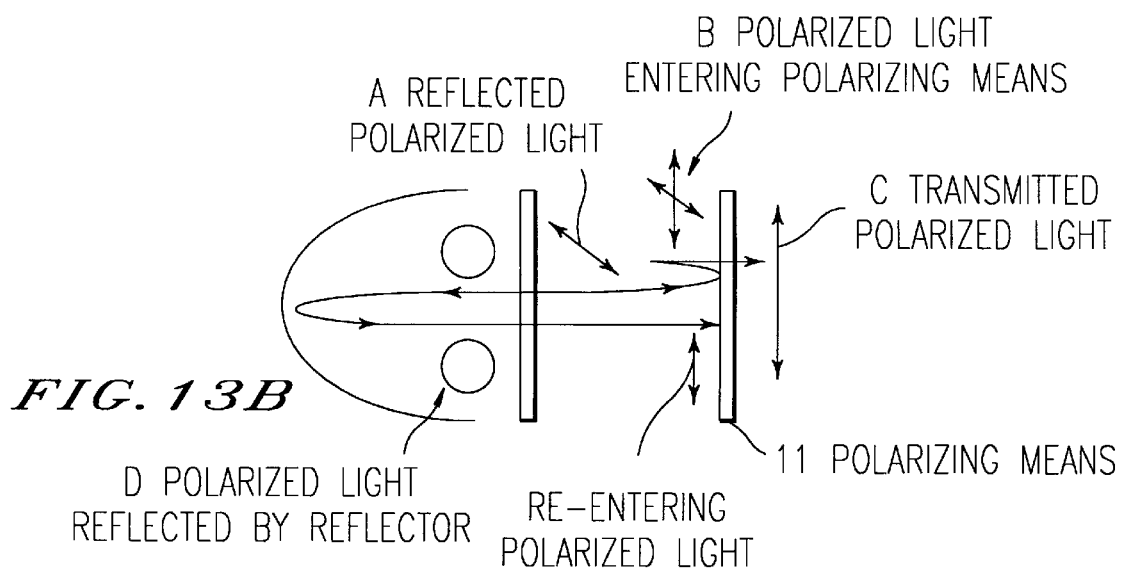

Light having been reflected by the polarizing means is reflected by the reflector and again enters the polarizing means. It is desirable that the light again entering the polarizing means is in a non-polarized condition or comprises a polarized component capable of transmitting through the polarizing means. FIG. 13(a) and FIG. 13(b) show modifications of light being polarized or reflected by the polarizing means. In these, the polarizing means used transmits a specific linear polarized light therethrough while reflecting the remaining linear polarized light on its surface. The light having been reflected by the polarizing means and having reached the reflector is in a polarized condition. When the light-reflecting surface of the reflector is in a roughened condition, as in FIG. 13(a), the light having been reflected by the reflector loses its polarization to be in a non-polarized condition. When the reflector has a mirror surface and a quater-wave plate is disposed adjacent to the light input surface of the polarizing means, as in FIG. 13(b), the light that reaches the reflector may be converted into a circular polarized light while it passes through the quater-wave plate. In that case, before the thus-converted, circular polarized light again enters the polarizing means, its polarized condition may be again so converted that it comprises a polarized component capable of transmitting through the polarizing means.

The input light modulator and the polarizing means may often produce reflected light. In order to increase the light availability through the device of the invention, it is necessary that the reflected light efficiently re-enters the input light modulator or the polarizing means. Accordingly, in order that much reflected light from the input light modulator and the polarizing means reaches the reflector and that much reflected light from the reflector enters the input light modulator and the polarizing means, it is necessary that the light to be absorbed by the input light modulator is reduced as much as possible. Where the ratio of the thickness of the light source to the thickness of the waveguide falls between 0.1/1 and 0.9/1, the light loss may be reduced and the light from the light source is efficiently re-used.

In the present invention, for example, an acrylic plate having a thickness of from 2 to 20 mm or so may be used as the waveguide. The distance between the side surfaces of the waveguide at which the light source is disposed may be, for example, from 150 to 500 mm. If the thickness of the waveguide is small, the number of total reflections in the waveguide increases while light passes through the waveguide, thereby causing in-plane luminance non-uniformity. On the contrary, if the thickness of the waveguide is large, the in-plane luminance uniformity will increase, but the luminance is decreased. In order to obtain good results, the ratio of the thickness of the waveguide to the length thereof that is parallel to the lengthwise direction of the light source shall fall between 0.01/1 and 0.08/1.

Figure 14:
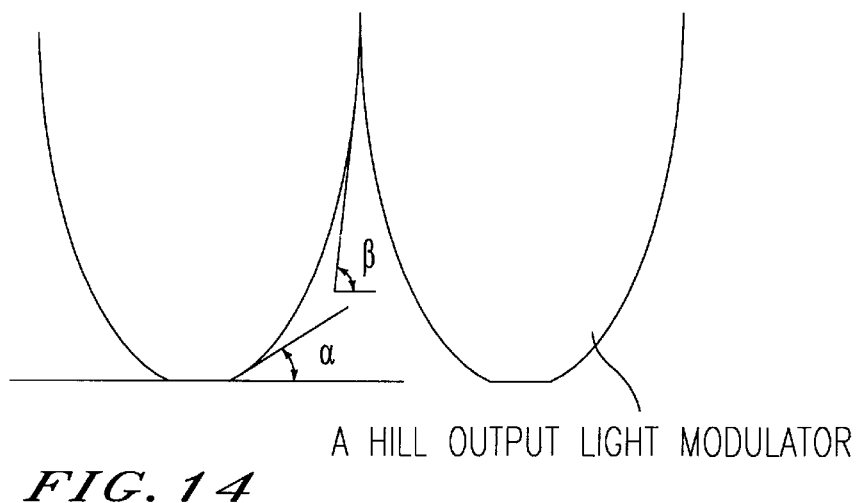
FIG. 14 is a graphic view showing one embodiment of the cross-sectional profile of the tapered hills of an output light modulator.

As in FIG. 14, it is desirable that the degree of the inclined wall of each hill of the output light modulator, relative to the light output surface of the waveguide, falls between 20° and 89°, but more desirably between 30° and 89°.

As the resin for the waveguide, employed is one with high transparency, which includes, for example, acrylic resin, polycarbonate resin, polystyrene resin and the like. The surface profile of the input light modulator and the output light modulator may be formed, for example, in a thermal pressing method, a 2P method for UV curing, a 2P method for thermal curing, an injection molding method using a female mold, etc. The input light modulator is not limited to only a plate but may be a sheet. The mass-producibility of plate and sheet modulators is good, and it is easy to produce a large amount of plate and sheet modulators for use in the invention at low production costs. Regarding their incline, the hills of the input light modulator may not always be symmetric in the horizontal direction and in the vertical direction, and their incline may be varied both in the horizontal direction and in the vertical direction. Using the input light modulator having asymmetric hills will make it possible to shift the luminance peak not in the front direction but in any other specific direction. Where the peak direction is selected in accordance with the characteristics of the display panel as combined with the light source device, images of higher quality may be obtained.

As the transmission display device that may be disposed adjacent to the light output surface of the panel light source device of the invention to construct a display, in which the panel light source device acts as a backlight, employable is a liquid-crystal panel of STN, TFT, MINI or the like.

In the panel light source device of the invention, the luminance of light to be outputted in the oblique direction that oversteps the front direction of the device is reduced to thereby increase the light availability through the device. The display comprising the panel light source device has high luminance.

While the invention has been described in detail and with reference to specific embodiments thereof, it will be apparent to one skilled in the art that various changes and modifications can be made therein without departing from the spirit and scope thereof.

What is claimed is:

1. A panel light source device comprising:
   a light source;
   a reflector;
   a waveguide that receives through its side surfaces the light having been outputted by the light source and reflected by the reflector;
   an output light modulator provided on the light output surface of the waveguide and configured to modulate the output light from the light output surface of the waveguide toward the front direction of the light output surface; and
   an input light modulator provided between the light source and the side surface of the waveguide and configured to modulate the output light from the light source by offsetting toward the light output surface of the waveguide or toward the back surface of the waveguide opposite to the light output surface thereof.

2. The panel light source device as claimed in claim 1, wherein the input light modulator has a periodically jagged surface and is so disposed that the grating pattern of its periodically jagged surface is parallel to the lengthwise direction of the light source.

3. The panel light source device as claimed in claim 1, wherein the input light modulator has a periodically jagged surface and is so disposed that the grating pattern of its periodically jagged surface is perpendicular to the lengthwise direction of the light source.

4. The panel light source device as claimed in claim 1, wherein the input light modulator has a periodically jagged surface and is so disposed that its periodically jagged surface faces the side surface of the waveguide, that the grating pattern of the periodically jagged surface is parallel to the lengthwise direction of the light source and that the input light modulator is inclined relative to the light from the light source.

5. The panel light source device as claimed in claim 1, further comprising a second input light modulator, wherein said input light modulator and second input light modulator having a periodically jagged surface and are so disposed between the light source and the side surface of the waveguide that the grating pattern of the periodically jagged surface of one of said input light modulator and second input modulator is perpendicular to that of the periodically jagged surface of the other.

6. The panel light source device as claimed in claim 5, wherein the jagged surface of one of said input light modulator and second light input modulators is disposed adjacent to the side surface of the waveguide faces the light source in such a manner that the grating pattern of the jagged surface is parallel to the lengthwise direction of the light source, while the jagged surface of the other input light modulator disposed adjacent to the light source faces the side surface of the waveguide in such a manner that the grating pattern of the jagged surface is perpendicular to the lengthwise direction of the light source.

7. The panel light source device as claimed in claim 5, wherein the jagged surface of one of said input light modulator and second input light modulators is disposed adjacent to the side surface of the waveguide faces the side surface of the waveguide in such a manner that the grating pattern of the jagged surface is perpendicular to the lengthwise direction of the light source, while the jagged surface of the other input light modulator disposed adjacent to the light source faces the light source in such a manner that the grating pattern of the jagged surface is parallel to the lengthwise direction of the light source.

8. The panel light source device as claimed in claim 7, wherein the input light and second input light modulators are integrated in such a manner that their non-jagged surfaces are in airtight contact with each other.

9. The panel light source device as claimed in claim 5, wherein the jagged surface of one of said input light modulator and second input light modulators is disposed adjacent to the side surface of the waveguide faces the light source in such a manner that the grating pattern of the jagged surface is parallel to the lengthwise direction of the light source, while the jagged surface of the other input light modulator disposed adjacent to the light source faces the side surface of the waveguide in such a manner that the grating pattern of the jagged surface is perpendicular to the lengthwise direction of the light source.

10. The panel light source device as claimed in claim 5, wherein the jagged surface of one of said input light modulator and second input light modulators is disposed adjacent to the side surface of the waveguide faces the side surface of the waveguide surfaces in such a manner that the grating pattern of the jagged surface is perpendicular to the lengthwise direction of the light source, while the jagged surface of the other input light modulator is disposed adjacent to the light source faces the light source in such a manner that the grating pattern of the jagged surface is parallel to the lengthwise direction of the light source.

11. The panel light source device as claimed in claim 1, further comprising a polarizing device is disposed between the light source and the side surface of the waveguide.

12. The panel light source device as claimed in claim 11, wherein the polarizing device is configured to transmit therethrough a linear light component having been polarized in a specific direction.

13. The panel light source device as claimed in claim 11, wherein the polarizing device is configured to transmit therethrough a circular light component having been polarized in a specific direction.

14. The panel light source device as claimed in claim 11, wherein the input light modulator has a periodically jagged surface and is so disposed that the grating pattern of its periodically jagged surface is parallel to the lengthwise direction of the light source.

15. The panel light source device as claimed in claim 11, wherein the input light modulator has a periodically jagged surface and is so disposed that the grating pattern of its periodically jagged surface is perpendicular to the lengthwise direction of the light source.

16. The panel light source device as claimed in claim 11, wherein said input light and second input light modulators each having a periodically jagged surface and the polarizing device is so disposed between the light source and the side surface of the waveguide that the grating pattern of the periodically jagged surface of one of said input light and second input light modulators is perpendicular to that of the periodically jagged surface of the other.

17. The panel light source device as claimed in claim 16, wherein the jagged surface of one of said input light and second input light modulators is disposed adjacent to the side surface of the waveguide faces the side surface of the waveguide in such a manner that the grating pattern of the jagged surface is perpendicular to the lengthwise direction of the light source, while the jagged surface of the other input light modulator is disposed adjacent to the light source faces the light source in such a manner that the grating pattern of the jagged surface is parallel to the lengthwise direction of the light source.

18. The panel light source device as claimed in claim 16, wherein the jagged surface of one of said input light and second input light modulators disposed adjacent to the side surface of the waveguide faces the light source in such a manner that the grating pattern of the jagged surface is parallel to the lengthwise direction of the light source, while the jagged surface of the other input light modulator disposed adjacent to the light source faces the side surface of the waveguide in such a manner that the grating pattern of the jagged surface is perpendicular to the lengthwise direction of the light source.

19. The panel light source device as claimed in claim 16, wherein the input light and second input light modulators are integrated in such a manner that their non-jagged surfaces are in airtight contact with each other.

20. The panel light source device as claimed in claim 16, wherein one of said input light and second input light modulators is integrated with the polarizing device via the non-jagged surface of the modulator.

21. The panel light source device as claimed in claim 11, wherein the surface of the reflector is so roughened that the light as reflected by the reflector is not in a specific polarized condition.

22. The panel light source device as claimed in claim 11, wherein said polarizing device includes at least one surface provided with a quater-wave plate.

23. The panel light source device as claimed in claim 1, wherein the input light modulator has a jagged surface and the cross-sectional profile of each hill of the jagged surface is triangular.

24. The panel light source device as claimed in claim 23, wherein the jagged surface of the input light modulator faces the light source, and the vertical angle of each hill of the jagged surface is between 70° and 95°.

25. The panel light source device as claimed in claim 23, wherein the jagged surface of the input light modulator faces the side surface of the waveguide, and the vertical angle of each hill of the jagged surface is between 70° and 110°.

26. The panel light source device as claimed in claim 1, wherein the input light modulator has a jagged surface, and the cross-sectional profile of each hill of the jagged surface is an arc.

27. The panel light source device as claimed in claim 26, wherein the ratio of the grating period, P, of the jagged structure to the grating height, H, thereof, H/P is between 0.1/1 and 0.7/1.

28. The panel light source device as claimed in claim 1, wherein the input light modulator has a jagged surface, and the cross-sectional profile of each hill of the jagged surface is a sine curve.

29. The panel light source device as claimed in claim 28, wherein the ratio of the grating period, P, of the jagged structure to the grating height, H, thereof, H/P is between 0.1/1 and 0.9/1.

30. The panel light source device as claimed in claim 1, wherein the output light modulator has a periodically jagged surface, and the tip of each hill of the jagged surface is in airtight contact with the light output surface of the waveguide.

31. The panel light source device as claimed in claim 1, wherein the degree of the inclined wall of each hill of the output light modulator, relative to the light output surface of the waveguide, is between 20° and 89°.

32. The panel light source device as claimed in claim 1, wherein the ratio of the thickness of the waveguide to the thickness of the light source is between 0.1/1 and 0.9/1.

33. The panel light source device as claimed in claim 1, wherein the ratio of the thickness of the waveguide to the length thereof that is parallel to the lengthwise direction of the light source is between 0.01/1 and 0.08/1.

34. A display comprising a panel light source device and a display device, in which the panel light source device comprises a light source, a reflector, a waveguide that receives through its side surfaces the light having been outputted by the light source and reflected by the reflector, an input light modulator as provided between the light source and the side surface of the waveguide to modulate the output light from the light source toward the light output surface of the waveguide or toward the back surface of the waveguide opposite to the light output surface thereof, and an output light modulator as provided on the light output surface of the waveguide to modulate the output light from the light output surface of the waveguide toward the front direction of the light output surface.

35. The display as claimed in claim 34, wherein the display device is a liquid-crystal panel.

36. A display comprising a panel light source device and a display device, in which the panel light source device comprises a light source, a reflector, a waveguide that receives through its side surfaces the light having been outputted by the light source and reflected by the reflector, an input light modulator as provided between the light source and the side surface of the waveguide to modulate the output light from the light source toward the light output surface of the waveguide or toward the back surface of the waveguide opposite to the light output surface thereof, a polarizing means, and an output light modulator as provided on the light output surface of the waveguide to modulate the output light from the light output surface of the waveguide toward the front direction of the light output surface.

37. The display as claimed in claim 36, wherein the display device is a liquid-crystal panel having a polarizer on its light input surface, and the transmission axis of said polarizer is parallel to the transmission axis of the polarizing means that transmits therethrough a polarized light component in a specific direction.

38. The display as claimed in claim 36, wherein a quater-wave plate is disposed between the display device of a liquid-crystal panel having a polarizer on its light input surface and the output light modulator, and wherein a circular polarized light having been outputted by the panel light source device via the polarizing means capable of transmitting therethrough a circular polarized light in a specific direction passes through the quater-wave plate while being converted into a linear polarized light of which the polarization direction is the same as the transmission axis of the polarizer.

39. A panel light source device comprising a light source, a reflector, a waveguide that receives through its side surfaces the light having been outputted by the light source and reflected by the reflector, an output light modulator as provided on the light output surface of the waveguide to modulate the output light from the light output surface of the waveguide toward the front direction of the light output surface, and a polarizing means, as provided between the light source and the side surface of the waveguide, having a function to transmit and reflect a specific circular polarized light and to convert the output light into a linear polarized light via a quater-wave plate provided adjacent to the light output surface of the polarizing means.

40. A panel light source device comprising a light source, a reflector, a waveguide that receives through its side surfaces the light having been outputted by the light source and reflected by the reflector, an output light modulator as provided on the light output surface of the waveguide to modulate the output light from the light output surface of the waveguide toward the front direction of the light output surface, and a polarizing means, as provided between the light source and the side surface of the waveguide, having a function to transmit a specific linear polarized light and to reflect a remaining linear polarized light.

* * * * *